United States Patent
Zheng et al.

(10) Patent No.: US 11,868,533 B2
(45) Date of Patent: Jan. 9, 2024

(54) SLIP SENSATION SIMULATION APPARATUS AND CONTROL SYSTEM

(71) Applicant: TENCENT TECHNOLOGY (SHENZHEN) COMPANY LIMITED, Shenzhen (CN)

(72) Inventors: Yu Zheng, Shenzhen (CN); Ruoxuan Jiang, Shenzhen (CN); Xiong Li, Shenzhen (CN); Xinyang Jiang, Shenzhen (CN); Zhengyou Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 14 days.

(21) Appl. No.: 17/670,416

(22) Filed: Feb. 11, 2022

(65) Prior Publication Data

US 2022/0164030 A1    May 26, 2022

Related U.S. Application Data

(63) Continuation of application No. PCT/CN2020/127480, filed on Nov. 9, 2020.

(30) Foreign Application Priority Data

Feb. 7, 2020  (CN) .......................... 202010083750.5

(51) Int. Cl.
    *G06F 3/01* (2006.01)
(52) U.S. Cl.
    CPC .................... *G06F 3/016* (2013.01)
(58) Field of Classification Search
    CPC ........ G06F 3/016; A63F 13/24; A63F 13/285; A63F 13/42; A63F 2300/1037
    (Continued)

(56) References Cited

U.S. PATENT DOCUMENTS 5,562,572 A  *  10/1996  Carmein ................ A63B 22/02
                                                        198/779
11,285,291 B2    3/2022  Prattichizzo et al.
(Continued)

FOREIGN PATENT DOCUMENTS

CN        101244563 A     8/2008
CN        102282973 A    12/2011
(Continued)

OTHER PUBLICATIONS

He European Patent Office (EPO) The Extended European Search Report for 20917924.1 dated Oct. 10, 2022 9 Pages.
(Continued)

*Primary Examiner* — Quan Zhen Wang
*Assistant Examiner* — Mancil Littlejohn, Jr.
(74) *Attorney, Agent, or Firm* — ANOVA LAW GROUP PLLC

(57) ABSTRACT

A slip sensation simulation apparatus includes a base, a first haptic assembly, and a second haptic assembly. The first haptic assembly includes a first synchronous belt, a plurality of first synchronous wheels, and a first motor. The first motor is in a transmission connection with one of the first synchronous wheels, to drive the first synchronous wheels and the first synchronous belt to rotate. The second haptic assembly includes a second synchronous belt, a plurality of second synchronous wheels, and a second motor. The second motor is in a transmission connection with one of the second synchronous wheels, to drive the second synchronous wheels and the second synchronous belt to rotate. The first synchronous belt is located at an inner side of the second synchronous belt. Rotational axial directions of the first and second synchronous belts are different. The first synchronous belt is in contact with the second synchronous belt.

20 Claims, 6 Drawing Sheets

(58) Field of Classification Search
USPC .................................................. 340/407.1
See application file for complete search history.

(56) References Cited

U.S. PATENT DOCUMENTS

| | | | | |
|---|---|---|---|---|
| 2003/0235492 | A1* | 12/2003 | Mirsky | ............... F04D 15/0022 |
| | | | | 415/1 |
| 2005/0148432 | A1 | 7/2005 | Carmein | |
| 2009/0119030 | A1 | 5/2009 | Fang et al. | |
| 2013/0207939 | A1 | 8/2013 | Kremin et al. | |
| 2014/0320405 | A1 | 10/2014 | Yu et al. | |
| 2015/0035658 | A1 | 2/2015 | Provancher et al. | |
| 2015/0214473 | A1* | 7/2015 | Hurley | ................... H10N 50/01 |
| | | | | 438/3 |
| 2016/0184731 | A1* | 6/2016 | Love | ......................... A63J 1/02 |
| | | | | 472/75 |

FOREIGN PATENT DOCUMENTS

| | | | | |
|---|---|---|---|---|
| CN | 106276048 | A | * | 1/2017 |
| CN | 108127644 | A | | 6/2018 |
| CN | 108161913 | A | | 6/2018 |
| CN | 109521784 | A | | 3/2019 |
| CN | 208640344 | U | * | 3/2019 |
| CN | 109857250 | A | | 6/2019 |
| CN | 111176458 | A | | 5/2020 |
| CN | 111437595 | A | | 7/2020 |
| JP | H0981026 | A | | 3/1997 |
| JP | 2000516829 | A | | 12/2000 |
| JP | 2006285785 | A | | 10/2006 |
| JP | 2010191605 | A | | 9/2010 |
| JP | 201784337 | A | | 5/2017 |
| JP | D20188250 | A | | 2/2019 |
| JP | 2021519476 | A | | 8/2021 |
| KR | 20130119821 | A | | 11/2013 |
| KR | 20150134200 | A | | 12/2015 |
| WO | 2019180677 | A1 | | 9/2019 |

OTHER PUBLICATIONS

The World Intellectual Property Organization (WIPO) International Search Report for PCT/CN2020/127480 dated Feb. 10, 2021 6 Pages (including translation).

The State Intellectual Property Office of the People's Republic of China (SIPO) Office Action 1 for 2020100837505 dated Oct. 28, 2020 7 Pages (including translation).

William R. Provancher et al., "Creating Fully Immersive Virtual and Augmented Reality by Emulating Force Feedback with Reactive Grip™ Touch Feedback," tacticalhaptics.com, adapted from IQT Quarterly, 6(2), 2014, p. 18-21, Rev. Aug. 2, 2019. 5 pages.

The Japan Patent Office (JPO) Notification of Reasons for Refusal for Application No. 2022-523510 and Translation dated Apr. 24, 2023 7 Pages.

Narihiro Nishimura, et al., "A Wearable Encounter Type Haptic Device for Presentation of Realistic Friction", Virtual Reality Society of Japan, Sep. 18, 2013.

Shunsuke Shimizu, et al., "Development of Slip Display using Rotation of Belt", the 17th Virtual Reality Society of Japan conventions Collected—papers, Sep. 12, 2012.

* cited by examiner

SLIP SENSATION SIMULATION APPARATUS AND CONTROL SYSTEM

CROSS-REFERENCES TO RELATED APPLICATIONS

This application is a continuation application of PCT Patent Application No. PCT/CN2020/127480, entitled "SLIP SENSE SIMULATION DEVICE AND CONTROL SYSTEM" and filed on Nov. 9, 2020, which claims priority to Chinese Patent Application No. 202010083750.5, entitled "SLIP SENSATION SIMULATION APPARATUS AND CONTROL SYSTEM" filed on Feb. 7, 2020, the entire contents of both of which are incorporated herein by reference.

FIELD OF THE TECHNOLOGY

The present disclosure relates to the field of teleoperation control, and specifically to a slip sensation simulation apparatus and a control system.

BACKGROUND OF THE DISCLOSURE

When a user teleoperates a controlled object, such as a robot or a game character, the controlled object generates tactile sensations during movement. In order to enable the user to have the same feeling of touch as the controlled object, the tactile sensations need to be simulated. Most existing tactile sensation simulation solutions are targeted for pressure tactile sensation (abbreviated as pressure sensation), but few for slip tactile sensation (abbreviated as slip sensation).

SUMMARY

According to an aspect, an embodiment of the present disclosure provides a slip sensation simulation apparatus, including a base, a first haptic assembly, and a second haptic assembly. The first haptic assembly includes a first synchronous belt, a plurality of first synchronous wheels, and a first motor. The first motor is in a transmission connection with one of the first synchronous wheels, to drive the first synchronous wheels and the first synchronous belt to rotate. The second haptic assembly includes a second synchronous belt, a plurality of second synchronous wheels, and a second motor. The second motor is in a transmission connection with one of the second synchronous wheels, to drive the second synchronous wheels and the second synchronous belt to rotate. The base receives both the first haptic assembly and the second haptic assembly. The first synchronous belt is located at an inner side of the second synchronous belt, an outer surface of at least one flat portion of the first synchronous belt is in contact with an inner surface of a flat portion of the second synchronous belt, and a rotational axial direction of the first synchronous belt is different from a rotational axial direction of the second synchronous belt.

According to another aspect, an embodiment of the present disclosure provides a control system, including a main controller, a pressure sensor, and the foregoing slip sensation simulation apparatus. The pressure sensor is provided on the slip sensation simulation apparatus and configured to generate pressure data. The main controller is electrically connected to the first motor and the second motor of the slip sensation simulation apparatus and electrically connected to the pressure sensor. The main controller is configured to receive slip sensation data of a controlled object, convert the slip sensation data into control signals of the first motor and the second motor, and control rotational speeds of the first motor and the second motor according to the control signals. The main controller is also configured to: receive the pressure data of the pressure sensor and convert the pressure data into a pressure control signal of the controlled object.

Another aspect of the present disclosure provides a control method based on the foregoing slip sensation simulation apparatus. The method includes: receiving, by the main controller of the slip sensation simulation apparatus, slip sensation data of a controlled object; converting, by the main controller, the slip sensation data into control signals of a first motor and a second motor of the slip sensation simulation apparatus; controlling, by the main controller, rotational speeds of the first motor and the second motor according to the control signals; receiving, by the main controller, pressure data of a pressure sensor of the slip sensation simulation apparatus; and converting, by the main controller, the pressure data into a control signal of the controlled object.

BRIEF DESCRIPTION OF THE DRAWINGS

To describe the technical solutions in the present disclosure more clearly, the following briefly introduces the accompanying drawings required for describing the implementations. Apparently, the accompanying drawings in the following description show merely some implementations of the present disclosure, and a person of ordinary skill in the art may still derive other drawings from these accompanying drawings without creative efforts.

DESCRIPTION OF EMBODIMENTS

Figure 1:
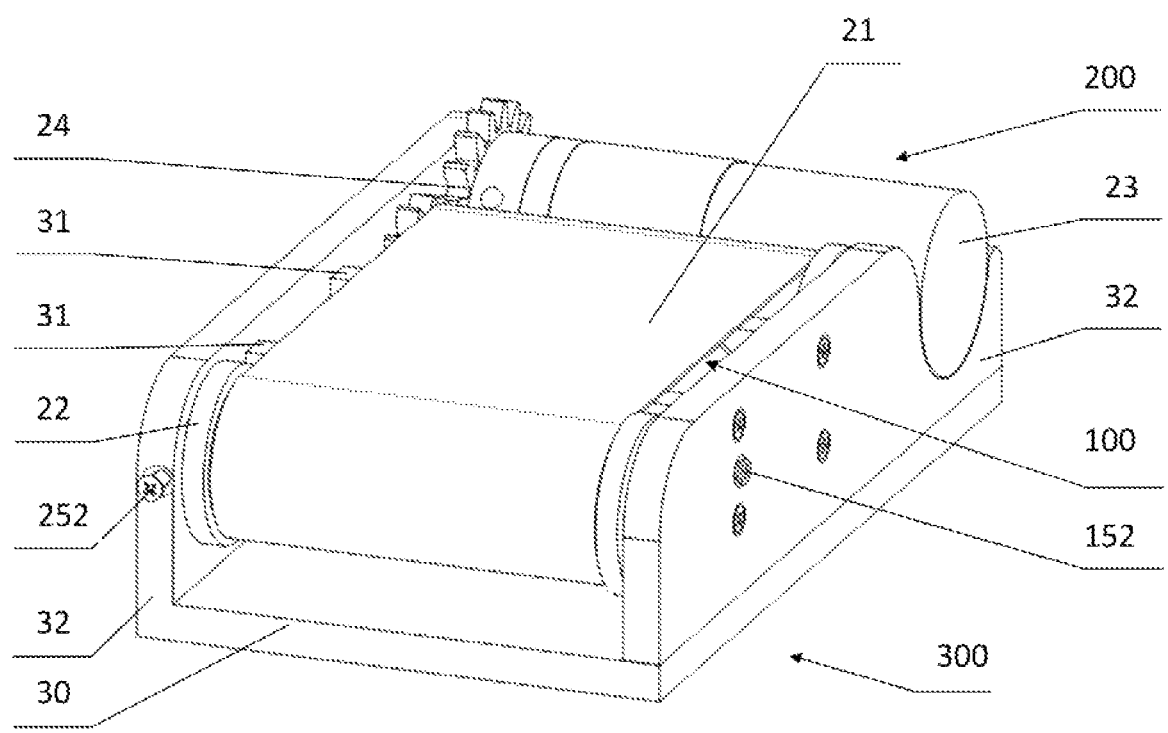
FIG. 1 is a schematic structural diagram of a slip sensation simulation apparatus according to an embodiment of the present disclosure.

The following clearly and completely describes technical solutions in implementations of the present disclosure with reference to the accompanying drawings in the implementations of the present disclosure.

To enable the above objects, features, and advantages of the present disclosure to be understood more clearly, the present disclosure will be described in detail below with reference to the accompanying drawings and specific implementations. The implementations in the present disclosure and features in the implementations may be combined with each other in the case of no conflict.

In the following description, many specific details are provided to facilitate a full understanding of the present disclosure. The described implementations are merely some but not all of the implementations of the present disclosure. All other implementations obtained by a person of ordinary skill in the art based on the implementations of the present disclosure without creative efforts shall fall within the protection scope of the present disclosure.

In addition, the following description of various embodiments is provided to exemplify some embodiments of the present disclosure with reference to accompanying drawings. The directional terms mentioned in the present disclosure, for example, "long", "left and right", "up and down", etc., are merely directions with reference to the attached drawings. Therefore, the directional terms used herein are for better and clearer description and do not indicate or imply that a device or an element referred to need have a specific orientation, be constructed and operated in a specific orientation. Thus, these terms cannot be interpreted as a limitation of the present disclosure. Unless otherwise explicitly specified or defined, the terms such as "install", "connect", and "connection" is to be understood in a broad sense. For example, the connection, may be a fixed connection, a detachable connection, or an integral connection; or the connection may be a mechanical connection; or the connection may be a direct connection, an indirect connection through an intermediary, or internal communication between two components. A person of ordinary skill in the art may understand the specific meanings of the foregoing terms in the present disclosure according to specific situations.

In an existing shear force display apparatus, a skin shear can be generated on a contact that moves in one or more two-dimensional or three-dimensional spaces. Simulation motions on a touch controller can reflect each aspect of a controlled object, thus can be used as virtual tactile in handle simulation games, thereby improving user experience in games. Although possessing the ability to simulate an object's motion, speed and feeling of vibration in a game, this solution has a limited range of movement, and can only move vertically in a single direction, thus cannot reflect a full-directional movement of the same plane; moreover, it has a complex structure, thereby being difficult to manufacture.

In view of this, the embodiments of the present disclosure provide a slip sensation simulation apparatus and a control system, which can simulate slip tactile sensations in a teleoperation, thereby allowing a user to perceive connection sliding of a plurality of directions and speeds.

Referring to FIG. 1, an embodiment of the present disclosure provides a slip sensation simulation apparatus, which can simulate slip tactile feedback provided by a tactile sensor at a robot's fingertip when a user (master or controller) manipulates a controlled device (such as the robot), so as to allow the user to perceive a slip direction and a slip speed of an object gripped by the robot.

The slip sensation simulation apparatus includes a base 300, a first haptic assembly 100, and a second haptic assembly 200. The first haptic assembly 100 and the second haptic assembly 200 are both provided on the base 300. The first haptic assembly 100 and the second haptic assembly 200 each has a synchronous belt structure. Specifically, with reference to FIG. 2, FIG. 3, and FIG. 4, the first haptic assembly 100 includes a first synchronous belt 11, two first synchronous wheels 12, and a first motor 13. The first synchronous belt 11 is sleeved on the two first synchronous wheels 12. The first motor 13 is in a transmission connection with one first synchronous wheel 12, to drive the two first synchronous wheels 12 and the first synchronous belt 11 to rotate. The second haptic assembly 200 includes a second synchronous belt 21, two second synchronous wheels 22, and a second motor 23. The second synchronous belt 21 is sleeved on the two second synchronous wheels 22. The second motor 23 is in a transmission connection with one second synchronous wheel 22, to drive the two second synchronous wheels 22 and the second synchronous belt 21 to rotate.

The first synchronous belt 11 is located at an inner side of the second synchronous belt 21. At least one flat portion of the first synchronous belt 11 is in contact with a flat portion of the second synchronous belt 21. A rotational axial direction of the first synchronous belt 11 is different from a rotational axial direction of the second synchronous belt 21.

It is to be understood that after the first synchronous belt 11 is sleeved on the two first synchronous wheels 12, the first synchronous belt 11 forms two arc portions that are respectively in contact with the two first synchronous wheels 12, and two flat portions located between the two first synchronous wheels 12. Similarly, the second synchronous belt 21 also has two arc portions and two flat portions. At least one of the two flat portions of the first synchronous belt 11 is in contact with the flat portions of the second synchronous belt 21. When a user's finger touches the flat portions of the second synchronous belt 21, the movement of the flat portions of the first synchronous belt 11 can be transmitted to the user's finger through the second synchronous belt 21, so as to allow the user to feel the sliding of the first synchronous belt 11. The first synchronous belt 11 and the second synchronous belt 21 are in surface-to-surface contact with each other. Thus, a contact area is increased, which is conductive to user's perception of a slippage. In this embodiment, only an above flat portion (i.e., the flat portion close to the user's finger and away from the base) of the first synchronous belt 11 is in contact with the flat portions of the second synchronous belt 21. This reduces a frictional force between the first synchronous belt 11 and the second synchronous belt 21, so as to weaken an influence of the frictional force on speeds of the first synchronous belt and the second synchronous belt, thereby ensuring accuracy of the slip sensation. In other embodiments, the two flat portions of the first synchronous belt may be respectively in contact with the two flat portions of the second synchronous belt.

The rotational axial direction of the first synchronous belt 11 and the rotational axial direction of the second synchronous belt 21 are different. That is, the two rotational axial directions are not parallel to each other but intersect at an angle, so that a sliding direction of the first synchronous belt 11 is at an angle with respect to a sliding direction of the second synchronous belt 21. When the user's finger touches the second synchronous belt 21, the user may simultaneously feel sliding motions of the first synchronous belt 11 and the second synchronous belt 21, and determine an overall direction and speed of an actual slippage according to a superposition of the sliding motions of the first synchronous belt 11 and the second synchronous belt 21.

In this embodiment, the rotational axial direction of the first synchronous belt 11 is perpendicular to the rotational axial direction of the second synchronous belt 21, so that the overall direction and speed of the actual slippage may be decomposed into a horizontal speed and a vertical speed. The first synchronous belt 11 and the second synchronous belt 21 respectively simulate the vertical slip speed and the horizontal slip speed, which simplifies calculation, thereby being conducive to simulations of a plurality of directions.

In other embodiments, the rotational axial direction of the first synchronous belt 11 and the rotational axial direction of the second synchronous belt 21 may intersect at other angles. A velocity in any direction may be composited, as long as the two rotational axial directions are not parallel to each other.

An outer surface of the first synchronous belt 11 is provided with a bump texture, so as to allow the sliding of the first synchronous belt 11 to be effectively transmitted to a user through the second synchronous belt 21. Further, specifically, the first synchronous belt 11 in this embodiment is a double-sided toothed rubber belt, teeth on whose inner surface ensure an effective engaged transmission between the first synchronous belt 11 and the two first synchronous wheels 12, and teeth on whose outer surface allows the user to clearly perceive a raised surface texture, thereby being easy to distinguish from the second synchronous belt 21.

A thickness of the second synchronous belt 21 is less than 1 mm. Minimizing the thickness of the second synchronous belt 21 makes the sliding of the first synchronous belt 11 easier to be perceived by the user through the second synchronous belt 21.

A second synchronous belt 21 is made of rubber and has a smooth inner surface, which reduces the frictional force caused by the contact with the first synchronous belt 11, and at the same time satisfy an effective transmission with the two second synchronous wheels 22.

In the slip sensation simulation apparatus according to the present disclosure, a double synchronous belt structure in which the first synchronous belt 11 and the second synchronous belt 21 cooperate with each other is used, which enables an infinite rotation with no constraints on a displacement range, thereby providing a continuous slip sensation simulation. Besides, slip simulations of different directions and speeds can be realized by compositing the sliding motions of two directions. The slip sensation simulation apparatus has a simple structure, which has advantages of easy manufacturing and low cost. Moreover, the slip sensation simulation apparatus allows the user to feel in real-time the slip speed and the slip direction of the controlled device corresponding to a controlled object, so as to transmit in real time a control signal to the controlled object for adjusting its slip speed.

Figure 4:
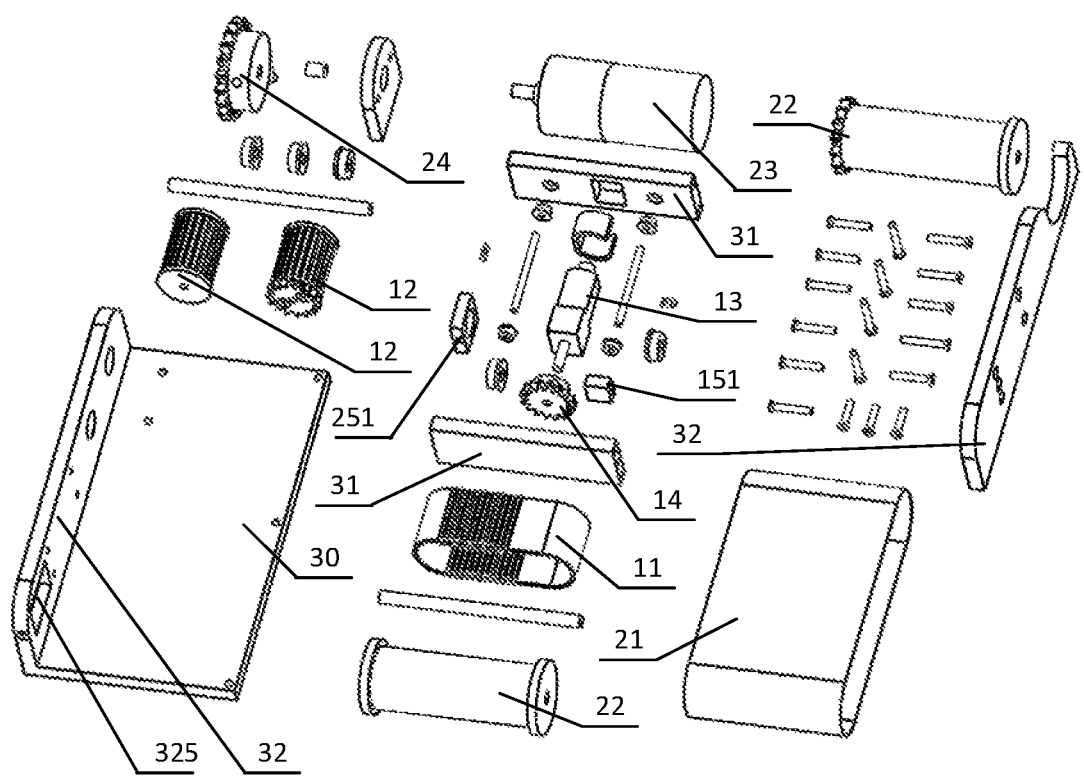
FIG. 4 is an exploded view of the slip sensation simulation apparatus as shown in FIG. 1.

In this embodiment, as shown in FIG. 4, the first synchronous wheels 12 and the second synchronous wheels 22 are all columnar, so that widths (dimensions in the rotational axial directions) of the first synchronous wheels 12 and the second synchronous wheels 22 are relatively large. Thus, the contact area of intersecting contact between the first synchronous belt and the second synchronous belt is relatively large, which is conducive to the user's perception of the slippage.

Figure 3:
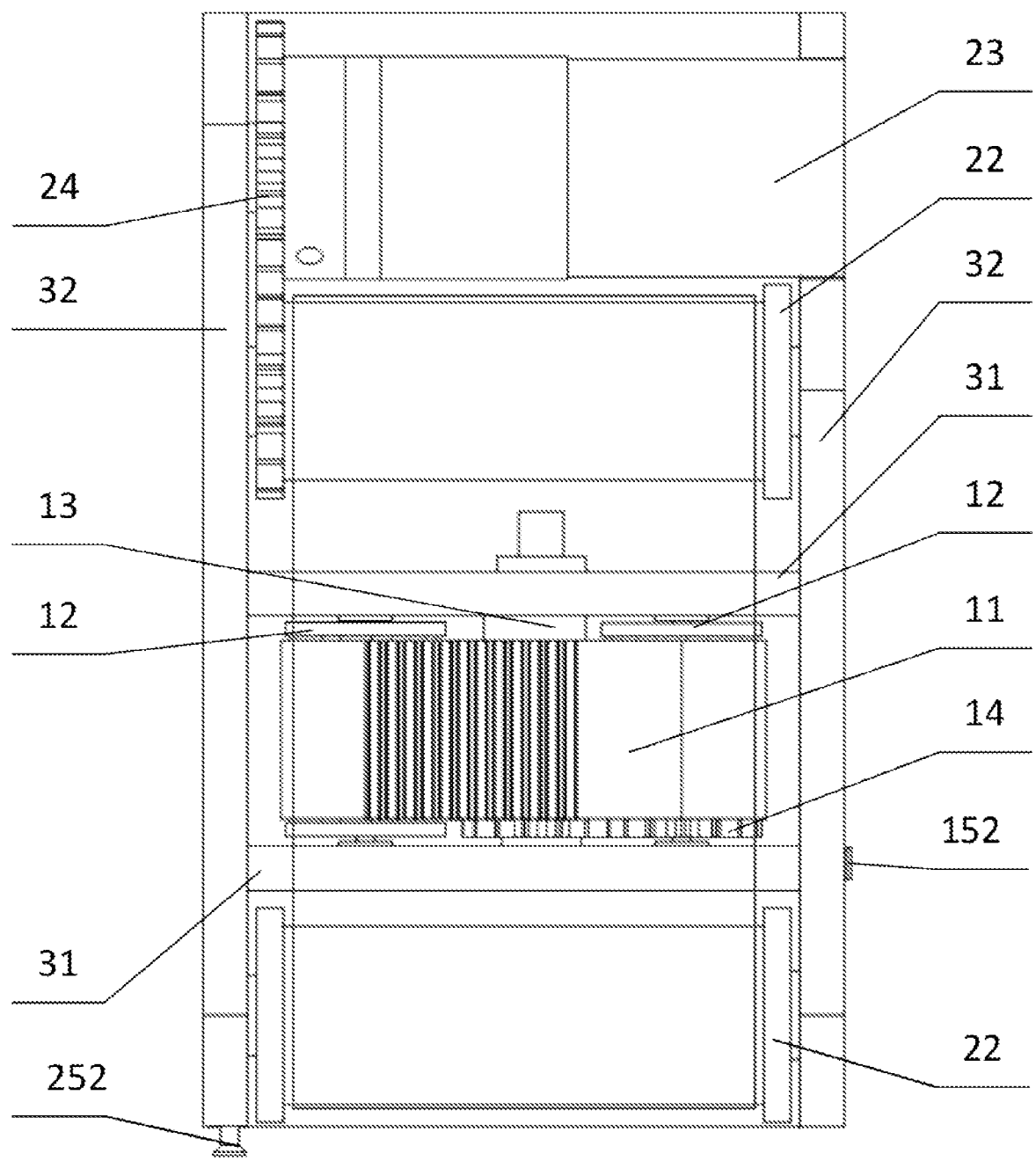
FIG. 3 is a top view of the slip sensation simulation apparatus as shown in FIG. 2 with a second synchronous belt not shown.

With reference to FIG. 3 and FIG. 4, the base 300 includes a bottom plate 30 and two outer plates 32. The two outer plates 32 are provided parallel and opposite to each other, and are both fixedly connected to the bottom plate 30. The two second synchronous wheels 22 are both rotatably provided between the two outer plates 32. A second tensioning mechanism is provided between one second synchronous wheel 22 and one outer plate 32. The second tensioning mechanism includes a second slider 251 and a second jacking screw 252. The outer plate 32 is provided with a second sliding hole 325. The second slider 251 is slidably provided in the second sliding hole 325, with a sliding direction being an arrangement direction of the two second synchronous wheels 22. The second jacking screw 252 is threaded to the outer plate 32, and extends into the second sliding hole 325 to connect with the second slider 251. The second synchronous wheel 22 is rotatably connected to the second slider 251 via a second rotating shaft. The second jacking screw 252 and the second slider 251 are cooperated to drive the second synchronous wheel 22 to move, so as to adjust a tension of the second synchronous belt 21, thereby facilitating adjustment of a tightness of contact between the first synchronous belt 11 and the second synchronous belt 21.

Figure 2:
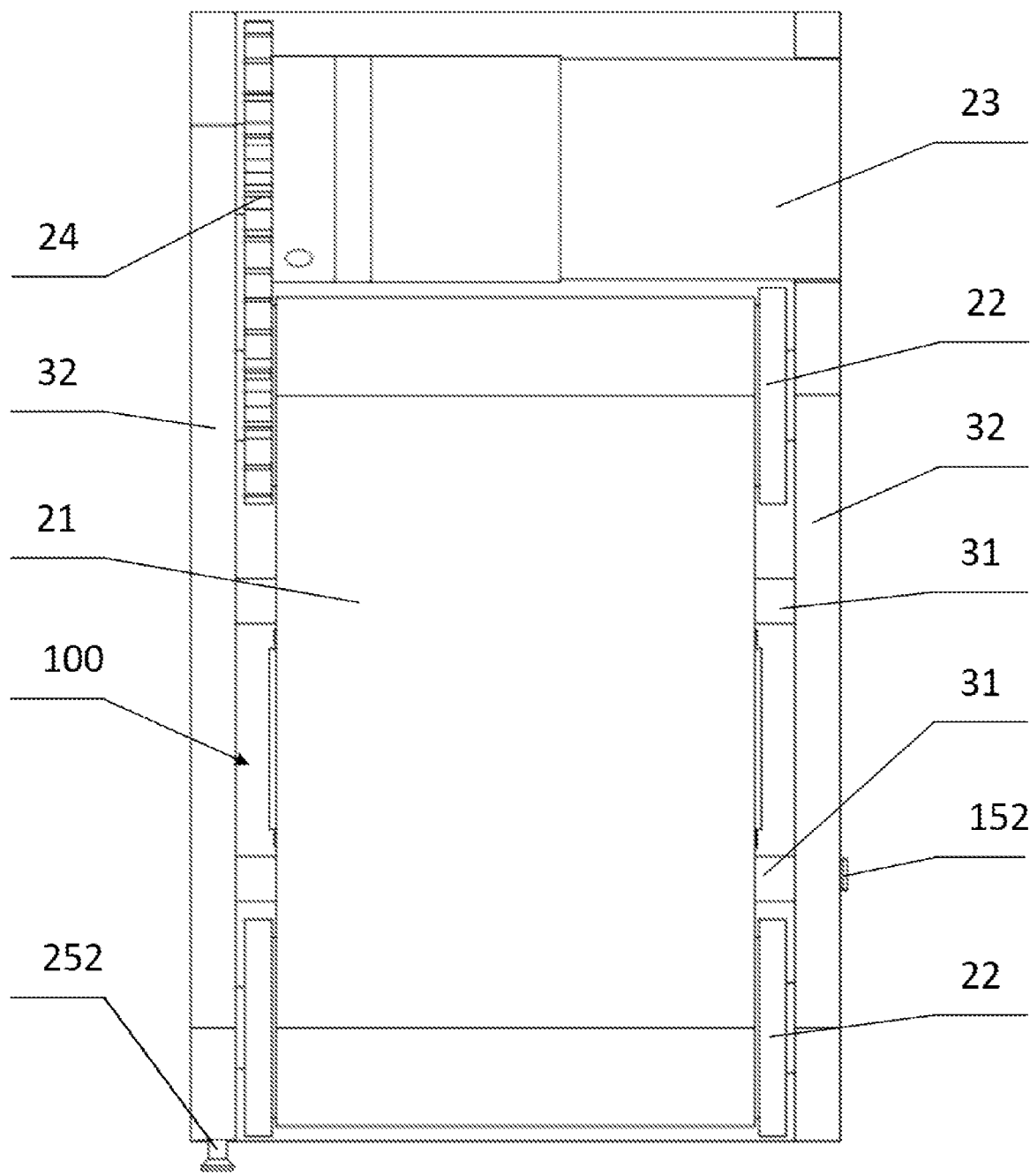
FIG. 2 is a top view of the slip sensation simulation apparatus as shown in FIG. 1.

As shown in FIG. 1 and FIG. 2, the second motor 23 is fixed to the bottom plate 30. The second motor 23 is located at an outer side of the second synchronous belt 21, which is advantageous to dispose the first synchronous belt 11 at the inner side of the second synchronous belt 21. More specifically, the second motor 23 is also located between the two outer plates 32 and is provided parallel with the two second synchronous wheels 22, to save space, thereby making an entire structure of the apparatus compact. An effective transmission between the second motor 23 and one second synchronous wheel 22 is realized by a second gear set 24. In other embodiments, the effective transmission between the second motor 23 and one second synchronous wheel 22 may be realized in other transmission modes, such as belt transmission, chain transmission, etc.

As shown in FIG. 3 and FIG. 4, the base 300 further includes two inner plates 31. The two inner plates 31 are provided parallel and opposite to each other. The two inner plates 31 are located between the two outer plates 32. The two inner plates 31 are fixedly connected with the two outer plates 32. The two first synchronous wheels 12 are rotatably provided between the two inner plates 31. A first tensioning mechanism is provided between one first synchronous wheel 12 and one inner plate 31. In this embodiment, the inner plates 31 are disposed in a vertical direction with respect to the outer plates 32, so as to allow the rotational axial direction of the first synchronous belt 11 to be perpendicular to the rotational axial direction of the second synchronous belt 21.

With reference to FIG. 4 and FIG. 1, the first tensioning mechanism includes a first slider 151 and a first jacking screw 152. The inner plate 31 is provided with a first sliding hole (not shown in the figures). The first slider 151 is slidably disposed in the first sliding hole, with a sliding direction being an arrangement direction of the two first synchronous wheels 12. The first jacking screw 152 is threaded to the outer plate 32 and the inner plate 31, and extends into the first sliding hole to connect with the first slider 151. The first synchronous wheel 12 is rotatably connected with the first slider 151 via a first rotating shaft. The first jacking screw 152 and the first slider 151 are cooperated to drive the first synchronous wheel 12 to move, so as to adjust a tension of the first synchronous belt 11, thereby facilitating adjustment of the tightness of contact between the first synchronous belt 11 and the second synchronous belt 21.

With reference to FIG. 3 and FIG. 4, the first motor 13 is fixedly connected to one inner plate 31, and the first motor 13 is located at an inner side of the first synchronous belt 11, to make the structure compact. The first motor 13 is in the transmission connection with one first synchronous wheel 12 via a first gear set 14. In other embodiments, an effective transmission between the first motor 13 and one first synchronous wheel 12 may be realized in other transmission modes, such as belt transmission, chain transmission, etc.

The first motor 13 and the second motor 23 may be direct current motors. As such, rotational speeds outputted by the two motors can be controlled by controlling voltages, thereby controlling rotational speeds of the first synchronous belt 11 and the second synchronous belt 21.

The slip sensation simulation apparatus provided by the embodiment of the present disclosure has a simple and compact structure, thereby having advantages of small size, easy manufacturing and low cost.

An embodiment of the present disclosure also provides a control system, including a main controller, a pressure sensor, and the foregoing slip sensation simulation apparatus. The pressure sensor is provided on the slip sensation simulation apparatus. The main controller is electrically connected to the first motor 13 and the second motor 23 of the slip sensation simulation apparatus. The main controller is configured to receive slip sensation data of a controlled object and convert the slip sensation data into control signals of the first motor 13 and the second motor 23, so as to control rotational speeds of the first motor 13 and the second motor 23. The pressure sensor is provided on the slip sensation simulation apparatus. The main controller is electrically connected to the pressure sensor. The main controller is configured to receive pressure data of the pressure sensor and convert the pressure data into a control signal of the controlled object.

After the main controller receives the slip sensation data including a slip direction and a slip speed of the controlled object, the main controller may convert the slip direction and the slip speed of the controlled object into voltage control signals of the first motor 13 and the second motor 23, so as to control the rotational speeds outputted by the first motor 13 and the second motor 23, thereby making the first synchronous belt 11 and the second synchronous belt 21 to reach corresponding rotational speeds. A user may feel a slippage of the controlled object as his or her finger touches a surface of the second synchronous belt 21 of the slip sensation simulation apparatus, and apply a suitable pressure to the second synchronous belt 21 of the slip sensation simulation apparatus. The pressure sensor may sense the pressure applied by the user, and then output the pressure to the controlled object by the main controller, so as to allow the controlled object to apply a corresponding pressure to a gripped object. As a result, the object can be tightly gripped, thereby preventing the slippage leading to a gripping failure.

In this embodiment, the pressure sensor is provided at a bottom of the base 300. After the user applies the pressure to the second synchronous belt 21, namely applying the pressure to the entire slip sensation simulation apparatus, the pressure sensor provided at the bottom of the base 300 may sense the pressure applied to the entire slip sensation simulation apparatus. In other embodiments, the pressure sensor may be provided in the first synchronous belt 11. After the user applies the pressure to the second synchronous belt 21, the pressure is transmitted to the pressure sensor at the inner side of the first synchronous belt 11 through the first synchronous belt 11, so as to allow the pressure sensor to sense the pressure applied by the user. The pressure sensor may be provided at any other suitable position of the slip sensation simulation apparatus as needed, as long as it is able to sense the pressure applied by the user.

Further, in this embodiment, the control system further includes a master control module. The master control module includes a main end proportional-integral-derivative (PID) controller, a first sensor configured to obtain an actual rotational speed of the first motor 13, and a second sensor configured to obtain an actual rotational speed of the second motor 23. The first sensor and the second sensor are both electrically connected to the master PID controller. The main controller is electrically connected to the first motor 13 and the second motor 23 via the master PID controller. Based on sensing data of the first sensor and the second sensor, the master PID controller adjusts the control signals outputted to the first motor and the second motor from the main controller, and then outputs adjusted control signals to the first motor and the second motor. The master PID controller, working on a PID control algorithm, may perform calculation and analysis on the control signals outputted from the main controller to the first motor 13 and the second motor 23 in combination with the actual rotational speeds of the first sensor and the second sensor, so as to adjust the speeds of the first motor 13 and the second motor 23.

In this embodiment of the present disclosure, the first motor 13 and the second motor 23 are small power direct current motors including built-in encoders. The built-in encoders are used to obtain the actual rotational speeds of the first motor 13 and the second motor 23, so as to calculate actual rotational speeds of the first synchronous belt 11 and the second synchronous belt 21, based on which whether the slip speed and the slip direction are accurate are determined. That is, the encoders that are included in the first motor 13 and the second motor 23 may be used as the first sensor and the second sensor, which simplifies the structure, thereby being easy to manufacture. In other embodiments, the first sensor may be a sensor configured to directly sense the rotational speed of the first synchronous belt 11, and it may be provided on the base 300. Correspondingly, the second sensor may be a sensor configured to directly sense the rotational speed of the second synchronous belt 21, and it may be provided on the base 300. In this way, the actual rotational speeds of the first synchronous belt 11 and the second synchronous belt 21 may be obtained through detection, and then the actual rotational speeds of the first motor 13 and the second motor 23 are calculated.

Figure 5:
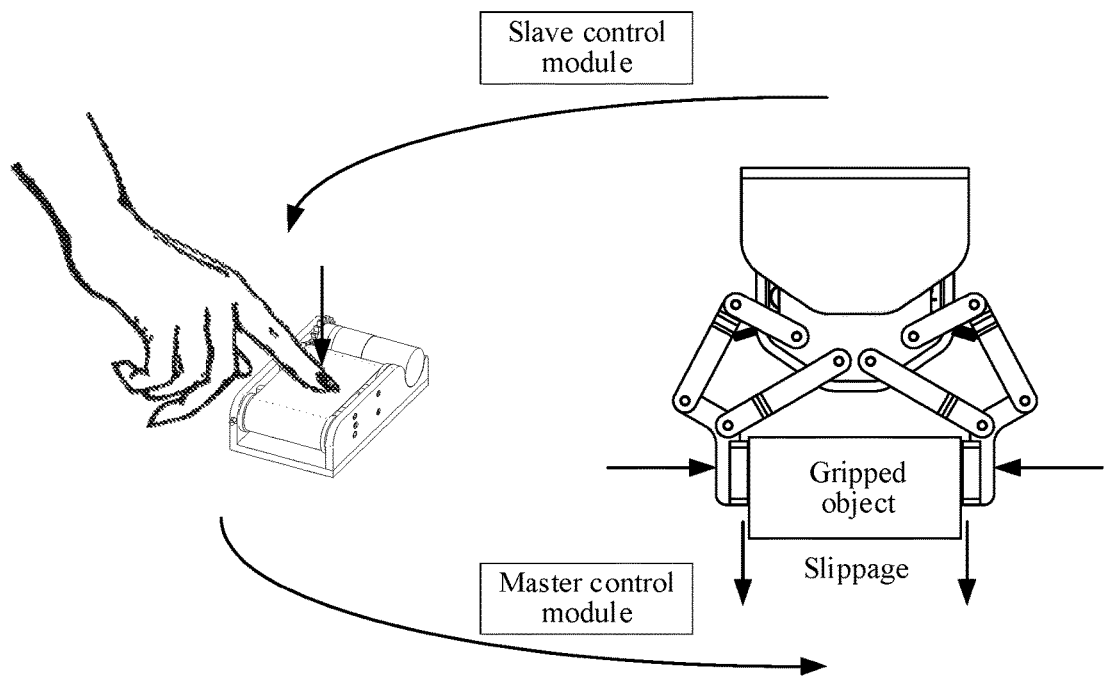
FIG. 5 is a schematic diagram showing control principle of a control system according to an embodiment of the present disclosure.
Figure 6:
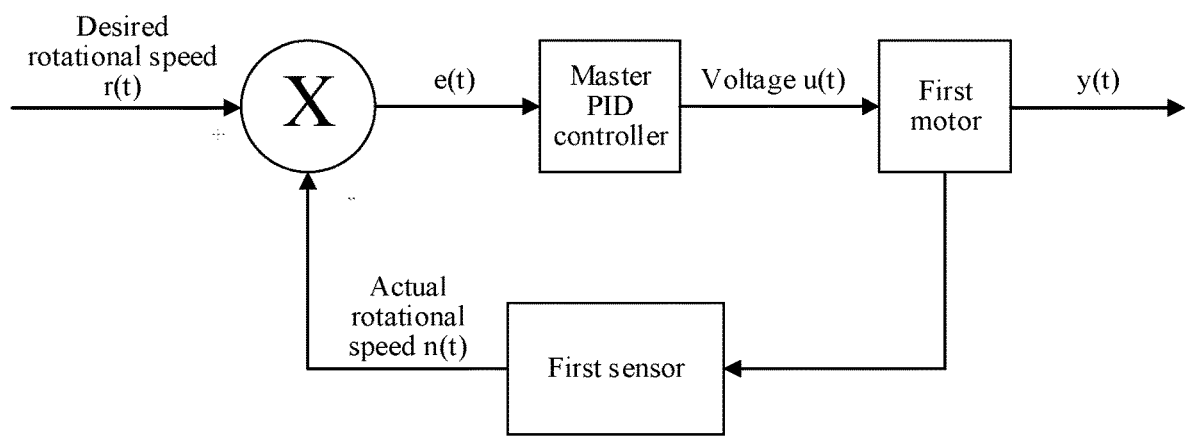
FIG. 6 is a schematic diagram showing control principle of a master control module in a control system according to an embodiment of the present disclosure.

As shown in FIG. 5 and FIG. 6, a speed adjustment principle used by the master control module to the first motor 13 is as follows. The main controller outputs a given rotational speed of the first motor 13, and the first sensor senses the actual rotational speed of the first sensor 13. A difference of the given rotational speed $r(t)$ and the actual rotational speed $n(t)$ is $e(t)=r(t)-n(t)$. After an adjustment processing, the master PID controller outputs a voltage control signal $u(t)$. $u(t)$ is subjected to power amplification, and then outputted to change the rotational speed of the first motor 13, thereby realizing slip speed simulation. A speed adjustment principle used by the master control module to the second motor 23 is the same as that to the first motor 13, which is not detailed herein.

The control system further includes a slave control module (also called a responder module). The slave control module includes a slave PID controller (also called a responder PID controller) and a slave sensor (also called a responder sensor) configured to sense a pressure of the controlled object. The main controller is electrically connected to the slave sensor via the slave PID controller. Based on sensing data of the pressure sensor and the slave sensor, the slave PID controller adjusts a pressure control signal outputted by the main controller and then outputs an adjusted pressure control signal to the controlled object.

In this embodiment, for example, the pressure of the controlled object is a force applied on an object by a robot hand. The pressure sensor senses a force applied by a user hand. The slave sensor senses a force that is actually outputted by the robot hand. The force applied by the robot hand is implemented by a robot motor and a mechanical transmission part of a robot finger. The pressure control signal outputted to the controlled object from the slave PID controller is a voltage signal of a motor of the mechanical transmission part.

Figure 7:
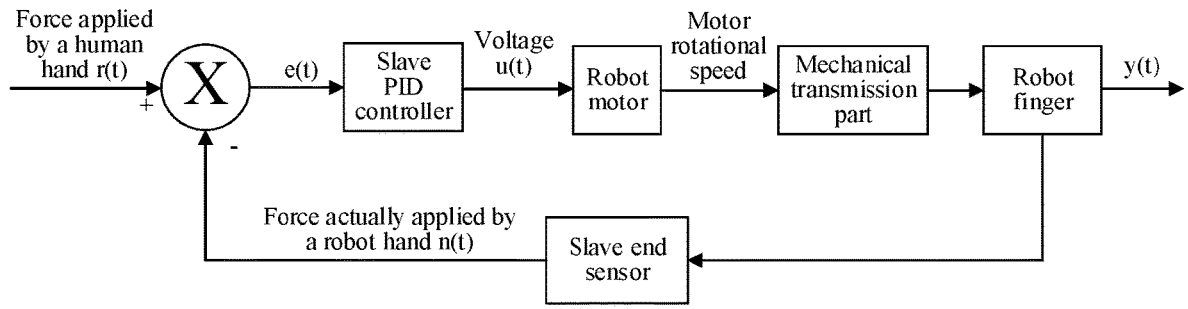
FIG. 7 is a schematic diagram showing control principle of a slave control module in a control system according to an embodiment of the present disclosure.

As shown in FIG. 7, an adjustment principle of the slave control module is as follows. A given pressure sensor senses a force applied by a human hand is r(t), a difference between the force r(t) and a force actually outputted by the robot n(t) is e(t)=r(t)−n(t). After an adjustment processing, the slave PID controller outputs a voltage control signal u(t) for the robot hand. Through a conversion from a motor rotational speed to a force applied by a robot finger, a rotational speed of a drive current motor of the robot hand or a gripper is changed, so as to adjust the force applied by the robot finger, thereby preventing the slippage of the object.

In the control system of the present disclosure, the pressure control on the controlled object may be realized by using the main controller to simply map a pressure value applied by the human hand to a voltage of the robot motor, with no need of using the slave control module. That is, there is no need to use the force actually applied by the robot hand as feedback, which simplifies the control system and control manner.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Figure 8:
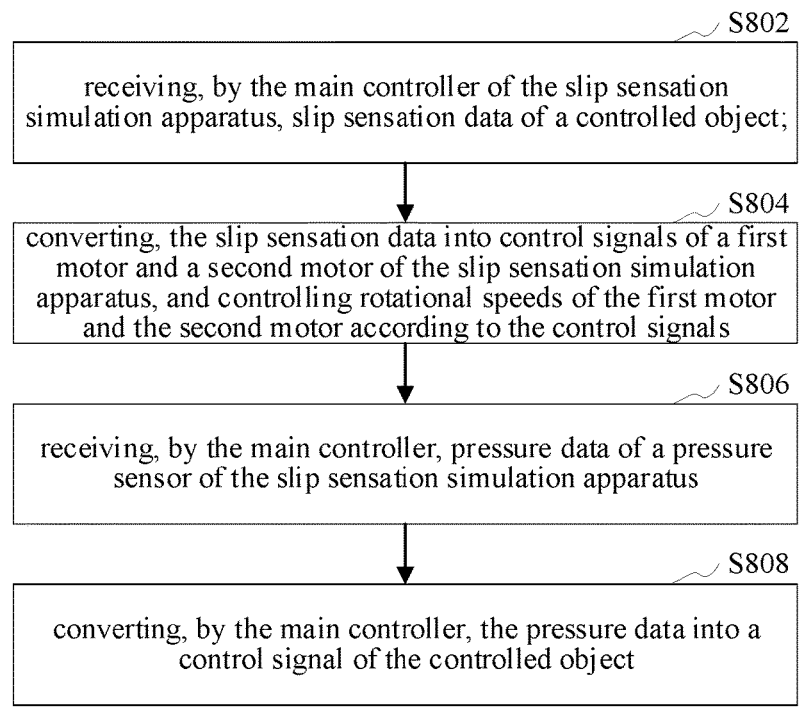
FIG. 8 is a schematic diagram showing a control method according to an embodiment of the present disclosure.

FIG. 8 is a schematic diagram showing a control method according to an embodiment of the present disclosure. The method is provided based on the foregoing slip sensation simulation apparatus. The method includes: receiving (S802), by the main controller of the slip sensation simulation apparatus, slip sensation data of a controlled object; converting (S804), by the main controller, the slip sensation data into control signals of a first motor and a second motor of the slip sensation simulation apparatus, and controlling rotational speeds of the first motor and the second motor according to the control signals; receiving (S806), by the main controller, pressure data of a pressure sensor of the slip sensation simulation apparatus; and converting (S808), by the main controller, the pressure data into a control signal of the controlled object.

In some embodiments, the method also includes obtaining, by a master proportional-integral-derivative (PID) controller of the slip sensation simulation apparatus electrically connected to a first sensor, a second sensor, and the main controller, sensing data of the first sensor including an actual rotational speed of the first motor; obtaining, by the master PID controller, sensing data of the second sensor including an actual rotational speed of the second motor; based on the sensing data of the first sensor and the second sensor, adjusting, by the master PID controller, the control signals outputted from the main controller to the first motor and the second motor; and outputting, by the master PID controller, the adjusted control signals to the first motor and the second motor.

In some embodiments, the method also includes obtaining, by a slave proportional-integral-derivative (PID) controller of the slip sensation simulation apparatus electrically connected to a slave sensor and the main controller, sensing data of the slave sensor, the sensing data including a pressure of the controlled object; and based on the sensing data of the slave sensor, adjusting the pressure control signal outputted by the main controller, and output an adjusted pressure control signal to the controlled object.

According to the embodiments of the present disclosure, the slip sensation simulation apparatus and the control system simulate the slip tactile feedback provided by the tactile sensor at the robot's fingertip when the user (master) teleoperates the robot (slave), so as to allow the user to perceive the slip direction and the slip speed of the object gripped by the robot. In addition, the first synchronous belts 11 and the second synchronous belt 21 that are orthogonal to each other. Thus, by controlling the rotational speeds of the first synchronous belt 11 and the second synchronous belt 21, the user is allowed to perceive the slip direction and slip speed of the object gripped by the robot. When the tactile sensor of the robot hand perceives or predicts that the gripped object has slipped or is about to slip, a feedback signal is used as an input to drive the first synchronous belt 11 and the second synchronous belt 21 in the slip sensation simulation apparatus via the control system, so as to remind the user. A user's reaction is acquired by the pressure sensor integrated in the slip sensation simulation apparatus, and an acquired force signal of the user is used as the input to control a gripping force of the robot hand, so as to prevent the object from the slippage, thereby forming a closed loop control system.

The solution has a simple hardware structure, thus has the advantages of easy manufacturing and low cost. In addition, the algorithm adopted by the control system is simple and efficient, as well as easy to implement.

The slip sensation simulation apparatus and the control system provided herein not only can simulate the slippage of the robot hand, but can also can be applied to other parts of the robot, or other scenarios, such as virtual reality, computer games, human-machine interaction, etc.

The foregoing descriptions are exemplary implementations of the present disclosure. A person of ordinary skill in the art may make some polishing without departing from the principle of the present disclosure and the improvements and polishing shall fall within the protection scope of the present disclosure.

What is claimed is:
1. A slip sensation simulation apparatus, comprising:
a first haptic assembly comprising a first synchronous belt, a plurality of first synchronous wheels, and a first motor, the first synchronous belt being sleeved on the first synchronous wheels, and the first motor being in a transmission connection with one of the first synchronous wheels, to drive the first synchronous wheels and the first synchronous belt to rotate;
a second haptic assembly comprising a second synchronous belt, a plurality of second synchronous wheels, and a second motor, the second synchronous belt being sleeved on the second synchronous wheels, and the second motor being in a transmission connection with one of the second synchronous wheels, to drive the second synchronous wheels and the second synchronous belt to rotate; and
a base that receives the first haptic assembly and the second haptic assembly;
wherein the first synchronous belt is located at an inner side of the second synchronous belt, an outer surface of at least one flat portion of the first synchronous belt is in contact with an inner surface of a flat portion of the second synchronous belt, and a rotational axial direc- tion of the first synchronous belt is different from a rotational axial direction of the second synchronous belt; and the second synchronous belt has a smooth inner surface that contacts the outer surface of the first synchronous belt.

2. The slip sensation simulation apparatus according to claim 1, wherein the rotational axial direction of the first synchronous belt is perpendicular to the rotational axial direction of the second synchronous belt.

3. The slip sensation simulation apparatus according to claim 1, wherein an outer surface of the first synchronous belt is provided with a bump texture.

4. The slip sensation simulation apparatus according to claim 1, wherein a thickness of the second synchronous belt is less than 1 mm.

5. The slip sensation simulation apparatus according to claim 1, wherein the second synchronous belt is made of rubber.

6. The slip sensation simulation apparatus according to claim 1, wherein the first synchronous wheels and the second synchronous wheels are columnar.

7. The slip sensation simulation apparatus according to claim 1, wherein the base comprises a bottom plate, two outer plates, and two inner plates; wherein:

the two outer plates are parallel and opposite to each other and both fixedly connected to the bottom plate, and the second synchronous wheels are rotatably provided between the two outer plates; and the second motor is fixed on the bottom plate and located at an outer side of the second synchronous belt; and the two inner plates are parallel and opposite to each other, the two inner plates are located between the two outer plates, and the two inner plates are fixedly connected to the two outer plates; the first synchronous wheels are rotatably provided between the two inner plates; and the first motor is fixedly connected to one of the two inner plates, and is located at an inner side of the first synchronous belt.

8. A control system, comprising:

a slip sensation simulation apparatus comprising:

a first haptic assembly comprising a first synchronous belt, a plurality of first synchronous wheels, and a first motor, the first synchronous belt being sleeved on the first synchronous wheels, and the first motor being in a transmission connection with one of the first synchronous wheels, to drive the first synchronous wheels and the first synchronous belt to rotate;

a second haptic assembly comprising a second synchronous belt, a plurality of second synchronous wheels, and a second motor, the second synchronous belt being sleeved on the second synchronous wheels, and the second motor being in a transmission connection with one of the second synchronous wheels, to drive the second synchronous wheels and the second synchronous belt to rotate; and a base that receives the first haptic assembly and the second haptic assembly;

wherein the first synchronous belt is located at an inner side of the second synchronous belt, an outer surface of at least one flat portion of the first synchronous belt is in contact with an inner surface of a flat portion of the second synchronous belt, and a rotational axial direction of the first synchronous belt is different from a rotational axial direction of the second synchronous belt;

a pressure sensor provided on the slip sensation simulation apparatus and configured to generate pressure data;

a main controller electrically connected to the first motor and the second motor of the slip sensation simulation apparatus and electrically connected to the pressure sensor, and the main controller being configured to:

receive slip sensation data of a controlled object, convert the slip sensation data into control signals of the first motor and the second motor, and control rotational speeds of the first motor and the second motor according to the control signals; and receive the pressure data of the pressure sensor and convert the pressure data into a pressure control signal of the controlled object, wherein the pressure control signal instructs the controlled object to apply a corresponding pressure to an object gripped by the controlled object.

9. The control system according to claim 8, further comprising:

a master proportional-integral-derivative controller;

a first sensor configured to obtain an actual rotational speed of the first motor; and a second sensor configured to obtain an actual rotational speed of the second motor; wherein, the first sensor and the second sensor are electrically connected to the master proportional-integral-derivative controller; and the main controller is electrically connected to the first motor and the second motor via the master proportional-integral-derivative controller; and the master proportional-integral-derivative controller is configured to, based on sensing data of the first sensor and the second sensor, adjust the control signals outputted from the main controller to the first motor and the second motor, and output the adjusted control signals to the first motor and the second motor, the sensing data of the first sensor and the second sensor including the actual rotational speed of the first motor and the actual rotational speed of the second motor.

10. The control system according to claim 8, further comprising: a slave proportional-integral-derivative controller and a slave sensor configured to sense a pressure of the controlled object, and the main controller being electrically connected to the slave sensor via the slave proportional-integral-derivative controller; wherein, the slave proportional-integral-derivative controller is configured to, based on sensing data of the slave sensor, adjust the pressure control signal outputted by the main controller, and output an adjusted pressure control signal to the controlled object.

11. The control system according to claim 8, wherein the rotational axial direction of the first synchronous belt is perpendicular to the rotational axial direction of the second synchronous belt.

12. The control system according to claim 8, wherein the second synchronous belt is made of rubber and has a smooth inner surface.

13. The control system according to claim 8, wherein the inner surface of the second synchronous belt is smoother than the outer surface of the first synchronous belt.

14. The control system according to claim 8, wherein the first synchronous wheels and the second synchronous wheels are columnar.

15. The control system according to claim 8, wherein the base comprises a bottom plate, two outer plates, and two inner plates; wherein:

the two outer plates are parallel and opposite to each other and both fixedly connected to the bottom plate, and the second synchronous wheels are rotatably provided between the two outer plates; and the second motor is fixed on the bottom plate and located at an outer side of the second synchronous belt; and the two inner plates are parallel and opposite to each other, the two inner plates are located between the two outer plates, and the two inner plates are fixedly connected to the two outer plates; the first synchronous wheels are rotatably provided between the two inner plates; and the first motor is fixedly connected to one of the two inner plates, and is located at an inner side of the first synchronous belt.

16. A control method, comprising:

receiving, by a main controller of a slip sensation simulation apparatus, slip sensation data of a controlled object;

converting, by the main controller, the slip sensation data into control signals of a first motor and a second motor of the slip sensation simulation apparatus;

controlling, by the main controller, rotational speeds of the first motor and the second motor according to the control signals, wherein the first motor is in a transmission connection with one of a plurality of first synchronous wheels, to drive the first synchronous wheels and a first synchronous belt to rotate, the first synchronous belt being sleeved on the first synchronous wheels; the second motor is in a transmission connection with one of a plurality of second synchronous wheels, to drive the second synchronous wheels and a second synchronous belt to rotate, the second synchronous belt being sleeved on the second synchronous wheels; the first synchronous belt is located at an inner side of the second synchronous belt, an outer surface of at least one flat portion of the first synchronous belt is in contact with an inner surface of a flat portion of the second synchronous belt, and a rotational axial direction of the first synchronous belt is different from a rotational axial direction of the second synchronous belt;

receiving, by the main controller, pressure data of a pressure sensor of the slip sensation simulation apparatus; and converting, by the main controller, the pressure data into a control signal of the controlled object, wherein the pressure control signal instructs the controlled object to apply a corresponding pressure to an object gripped by the controlled object.

17. The method according to claim 16, further comprising:

obtaining, by a master proportional-integral-derivative (PID) controller of the slip sensation simulation apparatus electrically connected to a first sensor, a second sensor, and the main controller, sensing data of the first sensor including an actual rotational speed of the first motor;

obtaining, by the master PID controller, sensing data of the second sensor including an actual rotational speed of the second motor;

based on the sensing data of the first sensor and the second sensor, adjusting, by the master PID controller, the control signals outputted from the main controller to the first motor and the second motor; and outputting, by the master PID controller, the adjusted control signals to the first motor and the second motor.

18. The method according to claim 16, further comprising:

obtaining, by a slave proportional-integral-derivative (PID) controller of the slip sensation simulation apparatus electrically connected to a slave sensor and the main controller, sensing data of the slave sensor, the sensing data including a pressure of the controlled object; and based on the sensing data of the slave sensor, adjusting the pressure control signal outputted by the main controller, and output an adjusted pressure control signal to the controlled object.

19. The control system according to claim 8, wherein the controlled object is configured to be teleoperated by using the main controller.

20. The control system according to claim 8, wherein the controlled object is a robot or a game character.

* * * * *